(12) United States Patent
Woskov et al.

(10) Patent No.: US 7,425,248 B1
(45) Date of Patent: Sep. 16, 2008

(54) GAS PROCESSING FOR WASTE TREATMENT UNIT HAVING COMBINED JOULE AND ARC HEATING ELECTRODE

(75) Inventors: Paul Woskov, Bedford, MA (US); David Y. Rhee, Chestnut Hill, MA (US); David A. Lamar, West Richland, WA (US); Jeffrey E. Surma, Richland, WA (US)

(73) Assignee: Integrated Environmental Technologies, LLC, Richland, WA (US)

( * ) Notice: Subject to any disclaimer, the term of this patent is extended or adjusted under 35 U.S.C. 154(b) by 1826 days.

(21) Appl. No.: 09/592,176

(22) Filed: Jun. 12, 2000

(51) Int. Cl.
*C07C 1/00* (2006.01)
*C01B 31/00* (2006.01)
*C01B 13/00* (2006.01)

(52) U.S. Cl. .................. 204/157.15; 204/157.47; 204/157.5

(58) Field of Classification Search ............ 204/157.15, 204/157.47, 157.5
See application file for complete search history.

(56) References Cited

U.S. PATENT DOCUMENTS

| 5,397,555 | A | * | 3/1995 | Steinwandel et al. ...... 423/215.5 |
| 5,666,891 | A | * | 9/1997 | Titus et al. ................... 110/250 |
| 5,829,248 | A | * | 11/1998 | Clifton ......................... 60/286 |

* cited by examiner

*Primary Examiner*—Edna Wong
(74) *Attorney, Agent, or Firm*—Douglas E. McKinley, Jr.

(57) ABSTRACT

A gas processing chamber for treating a gas stream containing an oxidant and carbon particles, having a gas inlet port for receiving the gas stream from a high temperature processing chamber, a gas outlet port for exhausting the processed gas stream, a microwave source for introducing microwave energy into the gas processing chamber having a sufficient power to induce the carbon to react with the oxidant, a microwave waveguide to direct the microwave energy at the gas stream for processing, a reflected microwave power dump for protecting the microwave source from reflected microwave power, and a window seal to separate the gas stream from the microwave source.

2 Claims, 2 Drawing Sheets

GAS PROCESSING FOR WASTE TREATMENT UNIT HAVING COMBINED JOULE AND ARC HEATING ELECTRODE

FIELD OF THE INVENTION

The present invention relates generally to apparatus for the processing of gas produced in hazardous waste treatment systems. More specifically, the present invention relates to the use of microwave energy to process water vapor, organic gasses, and carbon particles produced in high temperature waste treatment systems.

BACKGROUND OF THE INVENTION

Concerns associated with the long term fate of wastes and drawbacks associated with current waste disposal methods have led to a variety of different systems designed for the treatment and stabilization of those wastes. Systems which handle a wide variety of waste streams and which produce useful and/or benign products with a minimum amount of secondary waste streams are particularly preferred. Several schemes for achieving these desired ends have been proposed. High temperature systems which destroy waste by converting the inorganic portion of the waste into stable glasses and the organic portion of the waste into a useful synthesis gas are particularly notable. Many of these systems utilize plasmas to generate the high temperatures necessary to form stable, leach resistant glasses and to achieve the gaseous reactions necessary to form useful products such as synthesis gas from organic feed streams.

Plasmas are high temperature, ionized gasses which provide rapid and efficient heat transfer. The ability of plasmas to rapidly transfer heat to incoming organic feedstocks allows the plasma to simultaneously pyrolyze the organic feedstocks and provide the thermal energy to drive the endothermic steam reforming reactions of the pyrolyzed organic feedstocks. This dual benefit has been deployed with great success in systems utilizing plasmas including those described in U.S. Pat. No. 5,666,891, titled "Arc Plasma-Melter Electro Conversion System for Waste Treatment and Resource Recovery" to Titus et al. and which the entire contents are incorporated herein by reference, which shows a variety of particularly useful configurations wherein arc electrodes which produce the plasma are used in systems in various combinations with joule heating electrodes. In these arrangements, organic compounds contained in the waste are destroyed by pyrolysis, caused by the high temperatures of the plasma breaking the chemical bonds of the organic molecules. By introducing steam into the process chamber, these pyrolyzed organic constituents are converted into synthesis gas, a clean burning fuel consisting primarily of CO, $CO_2$ and $H_2$, through the steam reforming reaction. Other constituents of the waste, which are able to withstand the high temperatures without becoming volatilized, are made to form into a molten state which then cools to form a stable glass. By carefully controlling the vitrification process, the resulting vitrified glass may be made to exhibit great stability against chemical and environmental attack, with a high resistance to leaching of the hazardous components bound up within the glass. In this manner, these waste treatment systems may be utilized to convert waste materials into a high quality synthesis gas and a stable, environmentally benign, glass.

While systems utilizing plasma present significant advantages over prior art waste treatment systems, there still exist certain drawbacks related to the incomplete formation of CO, $CO_2$ and $H_2$, through the steam reforming reactions. In particular, plasma and other high temperature systems will occasionally fail to completely convert organic feedstocks into of CO, $CO_2$ and $H_2$, through steam reforming reactions. Typically, incomplete conversion is a result of a failure to either raise the materials to a sufficient temperature to bring about these reactions, or a failure to hold the materials at these high temperatures for a sufficient period of time to allow complete conversion. The incomplete conversion of the gasses and carbon particles adds to the cost of these systems, as equipment must be provided to treat or remove the organic gasses and carbon particles in the off gas of these systems. Thus, there exists a need for a method and apparatus which promotes the conversion of carbon particles, organic gasses and steam into CO, $CO_2$ and $H_2$, through steam reforming reactions.

SUMMARY OF THE INVENTION

The present invention is a method and apparatus for treating gasses having carbon particles, organic gasses, and steam. The present invention makes use of microwave electromagnetic radiation in the frequency range of 0.5-30 GHz to provide additional heat to a thermal reformer chamber placed in the exhaust path of a high temperature treatment system. The microwaves increase the thermal energy of the exhaust by one or both of two mechanisms. The first mechanism is direct heating of the molecular species in the exhaust by absorption of the microwaves by individual molecules. Molecules that have a dipole moment (a nonuniform distribution of positive and negative charge) such as $H_2O$ will be agitated by oscillating electric field of the microwaves to higher kinetic energies, thus heating the gas. The second mechanization is breakdown of the exhaust gas into a plasma by the microwaves, which are in turn strongly absorbed by free electrons in the plasma. The plasma thermal energy is then efficiently transferred by electron-molecule collisions. The presence of carbon particulates in the exhaust gas greatly facilitates the plasma breakdown mechanism by lowering the microwave power density at which plasma breakdown will occur. Loosely bound electrons of electrically conductive particles such as carbon are freed by sufficiently strong microwave electric fields to initiate plasma breakdown. The localized breakdown on or near the graphite or carbon particles will enhance the conversion of carbon to carbon monoxide. The energy of the microwaves will be concentrated on or near the carbon particle surface which is the location where the desired heterogeneous reaction between the oxidant and the carbon occurs. As previously described, the oxidant is typically steam or carbon dioxide, but the present invention should be understood to encompass other sources of oxygen. The use of microwaves to provide direct energy thus act synergistically to react carbon with steam in that the water molecule is selectively heated by the microwaves and the carbon particle is indirectly heated in a selective manner due to localized breakdown on or near the carbon particle surface.

OBJECTS

Accordingly, it is an object of the present invention to provide a method and apparatus for treating gasses having carbon particles, organic gasses, and steam.

It is a further object of the present invention to provide a method of treating a gas stream containing an oxidant and carbon particles by introducing the gas stream into a processing chamber, and exposing the gas stream to microwave energy having a sufficient power and for a sufficient period of time to induce the carbon to react with the oxidant.

It is a further object of the present invention to provide a method of treating a gas stream containing carbon particles utilizing steam and/or carbon dioxide as the oxidant.

It is a further object of the present invention to provide a method of treating a gas stream by providing microwave energy at a frequency between 500 MHz and 30 GHz.

It is a further object of the invention to provide a gas processing chamber for treating a gas stream containing an oxidant and carbon particles having a gas inlet port for receiving the gas stream from a high temperature processing chamber, a gas outlet port for exhausting the processed gas stream, a microwave source for introducing microwave energy into the gas processing chamber having a sufficient power to induce the carbon to react with the oxidant, a microwave waveguide to direct the microwave energy at the gas stream for processing, a reflected microwave power dump for protecting the microwave source from reflected microwave power, and a window seal to separate the gas stream from the microwave source.

DESCRIPTION OF THE PREFERRED EMBODIMENT (S)

The nature and operation of the present invention is illustrated by the following description of two preferred embodiments. The invention should in no way be limited to the specific example set forth in this description of the preferred embodiment; rather, it is presented merely to illustrate preferred and acceptable methods of practicing the present invention. In the various figures setting forth the features of the present invention, like numerals refer to like elements.

DETAILS OF PREFERRED EMBODIMENT

Figure 1:
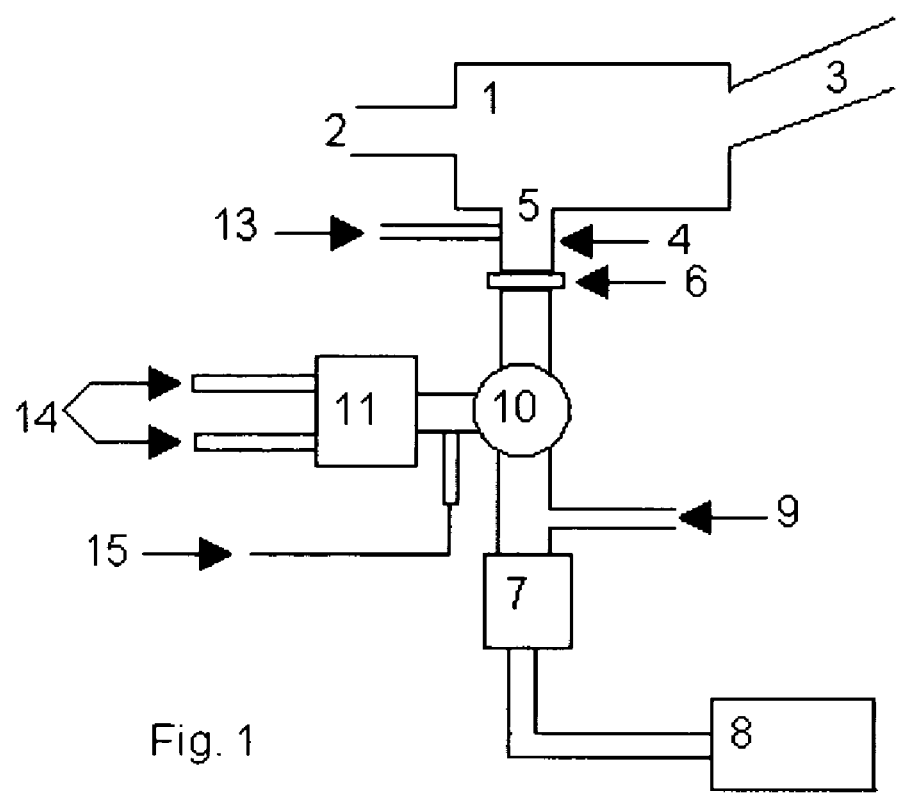
FIG. 1. is a schematic of the apparatus of a first preferred embodiment of the present invention.

The basic details of a first preferred embodiment of the present invention are shown in FIG. 1. A gas processing chamber 1, or thermal residence chamber (TRC), is a large, preferably metallic, enclosure having an input pipe 2 for the exhaust from the furnace, an output pipe 3 for the processed gases, and an input waveguide 4 for the microwaves. The TRC 1 is preferably constructed from an electrically conducting metal such as steel to reflectively trap microwaves that are not absorbed on the first pass through the exhaust gases. Also, the maximum aperture of the input 2 and output pipes 3 and other ports except for the waveguide port 5 preferably do not exceed approximately 40% of the microwave wavelength to trap the radiation inside the TRC 1. For a microwave frequency of 915 MHz this would correspond to a maximum aperture of approximately 13.0 cm (5.1"). Larger gas flow through areas can be achieved by combining a number of smaller pipes in parallel (not shown) or using a metallic grate inside a larger duct (not shown) where temperatures are low enough for such an implementation.

The microwaves are coupled to the TRC 1 by a standard metallic waveguide 4. For example, at 915 MHz this could be a WR-975 waveguide with an inside rectangular cross section of 9.750×4.875 inches (24.8×12.4 cm). A suitable distance away from the TRC 1, to insure cleanliness, the waveguide 4 is preferably sealed by a microwave transparent window 6 such as a high purity alumina ceramic plate. The edges of the window 6 can be cooled by water flow (not shown) and an inert gas flow such as nitrogen 13 blown across the window 6 side facing the TRC 1 to further insure the window 6 remains clean.

Microwaves are preferably generated by a magnetron microwave tube 7 which in turn is powered by an electrical power supply 8 which provides a low voltage for the heater filament and a high voltage for the anode. Nominal voltages are approximately 12 volts for the filament and 6,000 volts for the anode. At the microwave output of the magnetron 7 there is a microwave detector 9 for monitoring microwave power levels directed toward the TRC 1.

A microwave waveguide circulator 10 is connected to the magnetron 7 output to prevent microwave reflected power from reaching the magnetron 7. The circulator 10 is a standard microwave component that directs forward power from the magnetron 7 toward the TRC 1 and reflected power from the TRC 1 toward a microwave dump 11 as indicated by a reflected power detector 15. The +− microwave dump 11 absorbs the reflected power and subsequent heat is dissipated into a water-cooling line 14. The power ratings of the reflected power dump 11 and circulator 10 should be sufficient to handle the microwave power output of the magnetron 7. In the case where plasma breakdown is achieved inside the TRC 1 with the microwave source, the gas flow velocity will be of sufficient magnitude to blow the plasma away from the waveguide 4 into the TRC 1 and away from the TRC 1 walls. This may be accomplished by locating the microwave input 5 close to the exhaust gas input 2 where gas flow velocity is maximum, by a addition gas jets (not shown) near the inside TRC 1 walls, and by sufficient gas flow in the microwave waveguide 13 toward the chamber.

Figure 2:
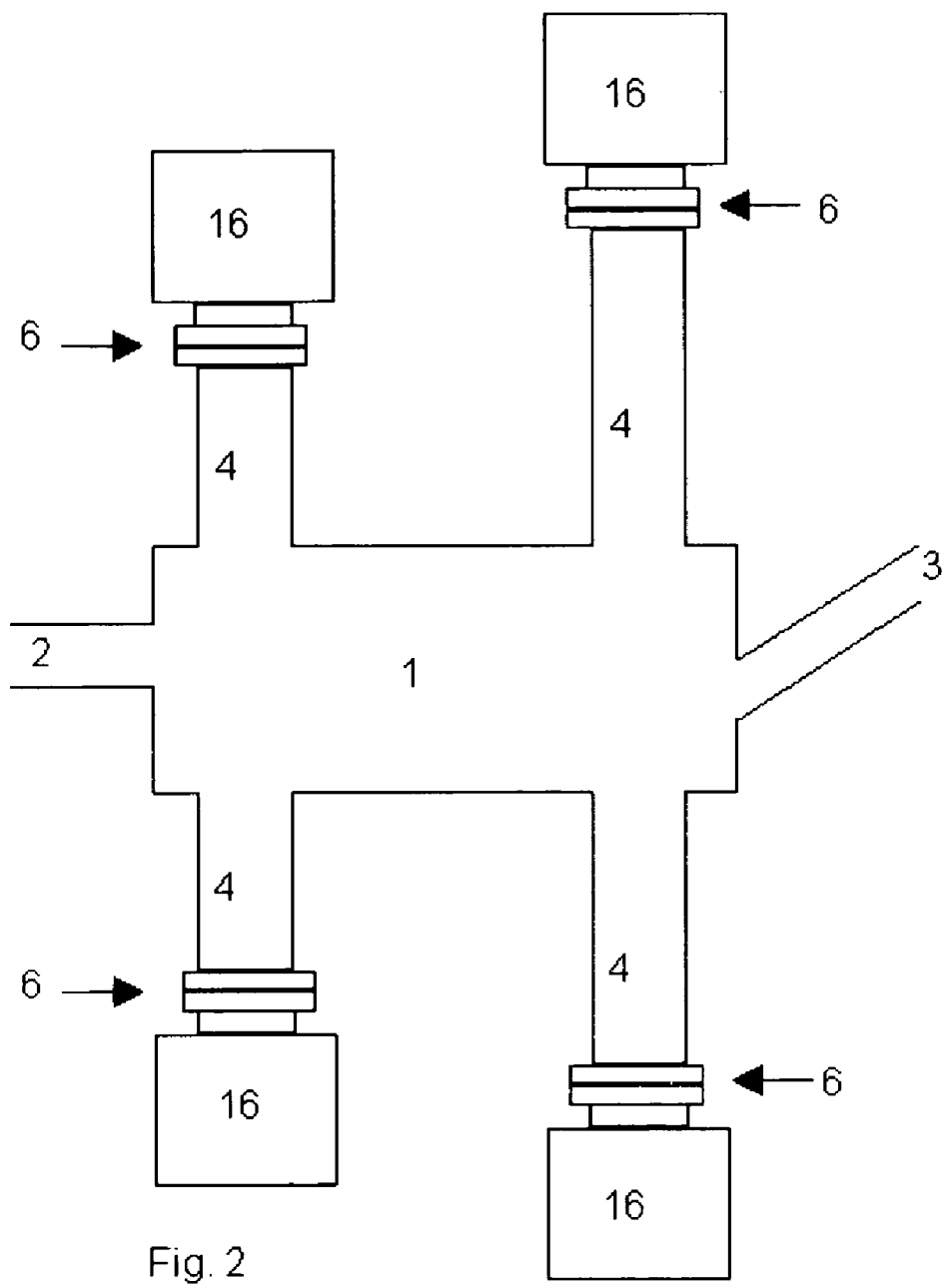
FIG. 2. is a schematic of the apparatus of a second preferred embodiment of the present invention.

A further embodiment of the microwave assisted TRC 1 would make use of multiple microwave power sources 16 as shown in FIG. 2. A microwave modular unit 16 would contain all the components shown in FIG. 1 on the microwave power side of the window seal 6. This design would make economical use of standard commercially available microwave sources to increase the maximum microwave power for additional heating in the TRC 1. For example, a standard power increment for 915 MHz is 75 kW, by combining four sources a total microwave heating power of 300 kW could be achieved. Higher heating power could be achieved with more units. The modular construction shown in FIG. 2 would also improve reliability and ease maintenance. One unit could be serviced or replaced without interrupting TRC operations.

While a preferred embodiment of the present invention has been shown and described, it will be apparent to those skilled in the art that many changes and modifications may be made without departing from the invention in its broader aspects. All such configurations are thus considered within the contemplation of the present invention, and the appended claims are therefore intended to cover all such changes and modifications which fall within the true spirit and scope of the invention.

We claim:

1. A method of forming a synthesis gas from an exhaust gas stream of a plasma arc waste treatment system containing steam, carbon dioxide and carbon particles comprising the steps of:
   a. introducing the exhaust gas stream into a processing chamber, and
   b. exposing the gas stream to microwave energy having sufficient power and for a sufficient period of time to induce the carbon particles to form said synthesis gas in a reaction with the steam and carbon dioxide.

2. The method of claim 1 wherein the microwave energy is provided at a frequency between 500 MHz and 30 GHz.

* * * * *